United States Patent
Zong et al.

(10) Patent No.: US 10,038,773 B2
(45) Date of Patent: Jul. 31, 2018

(54) COMMUNICATION SYSTEMS AND METHODS

(71) Applicant: Xiaoyi Technology Co., Ltd, Shanghai (CN)

(72) Inventors: Liang Zong, Shanghai (CN); Yangcun Chen, Shanghai (CN); Chao He, Shanghai (CN)

(73) Assignee: SHANGHAI XIAOYI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 15/418,968

(22) Filed: Jan. 30, 2017

(65) Prior Publication Data
US 2017/0257893 A1  Sep. 7, 2017

Related U.S. Application Data

(62) Division of application No. 15/151,619, filed on May 11, 2016.

(30) Foreign Application Priority Data

Mar. 2, 2016  (CN) .......................... 2016 1 0117954

(51) Int. Cl.
| | |
|---|---|
| *H04B 7/00* | (2006.01) |
| *H04M 1/66* | (2006.01) |
| *H04M 1/68* | (2006.01) |
| *H04M 3/16* | (2006.01) |
| *H04M 1/725* | (2006.01) |
| *H04L 29/06* | (2006.01) |
| *H04L 29/08* | (2006.01) |

(Continued)

(52) U.S. Cl.
CPC ........ *H04M 1/72533* (2013.01); *H04L 12/18* (2013.01); *H04L 12/189* (2013.01); *H04L 12/1881* (2013.01); *H04L 63/0428* (2013.01); *H04L 63/083* (2013.01); *H04L 65/4076* (2013.01); *H04L 67/104* (2013.01); *H04W 8/08* (2013.01); *H04W 12/04* (2013.01); *H04W 12/06* (2013.01); *H04W 12/08* (2013.01); *H04W 76/10* (2018.02); *H04W 76/11* (2018.02); *H04W 76/40* (2018.02); *H04M 2250/06* (2013.01); *H04W 84/12* (2013.01)

(58) Field of Classification Search
CPC .... H04W 12/08; H04W 76/002; H04W 76/02
USPC .............................. 455/41.2, 41.3, 410–411
See application file for complete search history.

(56) References Cited

U.S. PATENT DOCUMENTS

| | | | |
|---|---|---|---|
| 9,338,638 B1 | 5/2016 | Palin et al. | |
| 2006/0023733 A1* | 2/2006 | Shimizu ................ | H04L 63/083 370/432 |

(Continued)

*Primary Examiner* — Simon Nguyen
(74) *Attorney, Agent, or Firm* — Finnegan, Henderson, Farabow, Garrett & Dunner, L.L.P.

(57) ABSTRACT

Systems and methods for establishing communication between a terminal and a device are disclosed. According to certain embodiments, a method used in the device includes receiving a plurality of multicast packets from the terminal. The method also includes determining, according to the multicast packets, wireless connection information of a wireless network. The method further includes connecting to the wireless network according to the wireless connection information. The method further includes generating a notification indicating a password associated with the device.

9 Claims, 7 Drawing Sheets

(51) Int. Cl.
*H04W 12/08* (2009.01)
*H04L 12/18* (2006.01)
*H04W 12/06* (2009.01)
*H04W 8/08* (2009.01)
*H04W 12/04* (2009.01)
*H04W 76/40* (2018.01)
*H04W 76/10* (2018.01)
*H04W 76/11* (2018.01)
*H04W 84/12* (2009.01)

(56) References Cited

U.S. PATENT DOCUMENTS

| | | | |
|---|---|---|---|
| 2006/0089172 A1* | 4/2006 | Kim | H04M 1/2745 455/558 |
| 2006/0129836 A1* | 6/2006 | Kao | H04L 63/0428 713/184 |
| 2009/0144597 A1 | 6/2009 | Xue et al. | |
| 2013/0217333 A1 | 8/2013 | Sprigg et al. | |
| 2013/0303289 A1* | 11/2013 | Zhang | A63F 13/12 463/42 |
| 2014/0226817 A1* | 8/2014 | Von Huben | H04L 61/35 380/270 |
| 2014/0286323 A1* | 9/2014 | Hsu | H04W 76/021 370/338 |
| 2014/0372592 A1* | 12/2014 | Ye | H04L 41/0806 709/223 |
| 2015/0097689 A1* | 4/2015 | Logue | G08B 25/10 340/632 |
| 2015/0141005 A1 | 5/2015 | Suryavanshi et al. | |
| 2015/0312240 A1* | 10/2015 | Fu | H04W 4/008 726/5 |
| 2016/0087811 A1* | 3/2016 | Yin | H04L 12/189 370/312 |
| 2016/0127905 A1* | 5/2016 | Liu | H04W 12/06 370/338 |
| 2016/0135014 A1 | 5/2016 | Alharayeri | |
| 2016/0219024 A1 | 7/2016 | Verzun et al. | |
| 2016/0226732 A1 | 8/2016 | Kim et al. | |
| 2016/0227404 A1 | 8/2016 | Kollu et al. | |
| 2016/0285628 A1 | 9/2016 | Carrer et al. | |
| 2016/0285853 A1 | 9/2016 | Liu | |
| 2016/0344898 A1* | 11/2016 | Mitsuhashi | H04N 1/4413 |
| 2016/0374133 A1 | 12/2016 | Logue et al. | |
| 2017/0054770 A1* | 2/2017 | Wells | H04L 65/403 |
| 2017/0126671 A1 | 5/2017 | Haapanen et al. | |
| 2017/0195313 A1* | 7/2017 | Kirkby | H04L 63/083 |
| 2017/0244703 A1 | 8/2017 | Lee et al. | |

* cited by examiner

COMMUNICATION SYSTEMS AND METHODS

CROSS-REFERENCE TO RELATED APPLICATIONS

This is a divisional of application Ser. No. 15/151,619 filed May 11, 2016, and claims priority to Chinese Patent Application No. 201610117954.X, filed Mar. 2, 2016, the entire contents of all of which are incorporated herein by reference.

TECHNICAL FIELD

The present disclosure relates generally to the field of communication technologies, and more particularly, to systems and methods for establishing communication between a smart device and a terminal.

BACKGROUND

Many smart devices have a need to establish communication with a terminal. For example, a smart camera may be installed at a user's home and connected to the Internet through a network, such as a Wi-Fi (Wireless Fidelity) network. After forming a binding relationship with a mobile phone, the smart camera may stream images and videos to the mobile phone. In this manner, the user may monitor the home condition from a remote place, such as in the office. Moreover, the user may use the mobile phone to remotely control the smart camera, such as changing the focus or shooting direction of the smart camera.

To establish communication with a terminal, a smart device needs to obtain the local Wi-Fi connection information, which may contain a network identity and a password, and connect to the Wi-Fi according to the network connection information. Then the smart device also needs to form a binding relationship with the terminal. For a device with a user interface, such as a mobile phone or a tablet computer, a user may input the network connection information and complete the binding operations on the user interface. However, many smart devices, such as smart cameras, have no user interface or only have limited capabilities for user-machine interaction and thus the setup of communication between a smart devices and a terminal may be troublesome.

The disclosed methods and systems address one or more of the problems listed above.

SUMMARY

Consistent with one disclosed embodiment of the present disclosure, a method is provided for establishing communication between a device and a terminal. The method includes receiving a plurality of multicast packets from the terminal. The method also includes determining, according to the multicast packets, wireless connection information of a wireless network. The method further includes connecting to the wireless network according to the wireless connection information. The method further includes generating a notification indicating a password associated with the device.

Consistent with another disclosed embodiment of the present disclosure, a method is provided for establishing communication between a device and a terminal. The method includes generating, by the terminal, a graphic code, according to wireless connection information of a wireless network and a UID. The method also includes displaying the code by the terminal. The method also includes scanning the code by the device. The method further includes decoding, by the device, the code to extract the wireless connection information and the UID. The method further includes connecting, by the device, to the wireless network according to the wireless connection information.

Consistent with yet another disclosed embodiment of the present disclosure, a method is provided for establishing communication between a terminal and a device. The method includes determining that a condition has occurred. The method also includes retrieving, from a memory of the terminal, a user name, and a password of the device. The method also includes forming a P2P connection between the terminal and the device. The method further includes sending the user name and password to the device for verification. The method further includes, if the verification fails, obtaining from a server an updated password of the device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Figure 1:
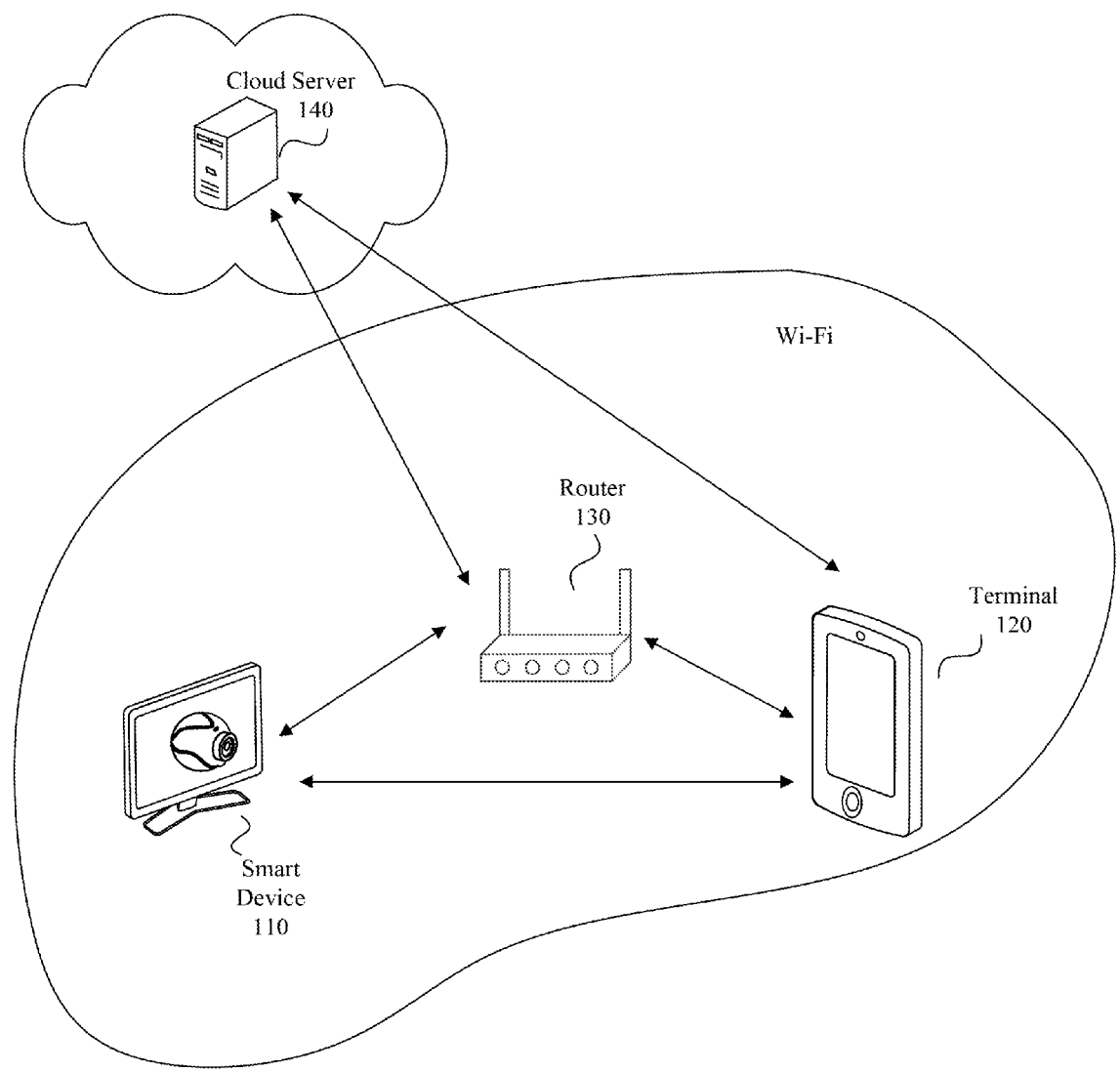
FIG. 1 is a schematic diagram illustrating a system for establishing communication between a terminal and a smart device, according to an exemplary embodiment.

FIG. 1 is a schematic diagram illustrating a system 100 for establishing a binding relationship between a terminal and a smart device, according to an exemplary embodiment.

Referring to FIG. 1, system 100 may include a smart device 110, a terminal 120, a router 130, and a cloud server 140.

Smart device 110 may be a device with certain computing capabilities, such as a smart camera, a smart wearable device (e.g., a wrist band), a smart air conditioner, a smart air purifier, a smart refrigerator, a smart socket, a smart door bell, etc. Smart device 110 may be configured to form wireless or wired communications with other devices, including terminal 120, router 130, and cloud server 140. For example, smart device 110 may include a built-in Wi-Fi module for wireless connection. Also for example, smart device 110 may include a Universal Serial Bus (USB) interface by which router 130 may be connected.

Terminal 120 may be an electronic device for receiving user input, such as a mobile phone, a tablet computer, a personal computer, a personal digital assistant (PDA), a remote controller, a medical device, exercise equipment, an ebook reader, a MP3 (Moving Picture Experts Group Audio Layer III) player, a MP4 player, etc. Terminal 120 may be configured to form wireless or wired communications with other devices, including smart device 110, router 130, and cloud server 140. Terminal 120 may include a user interface through which a user may enter various commands and data. For example, the user may use the user interface to initiate an application for connecting smart device 110 to a Wi-Fi network and binding smart device 110 to terminal 120, and to enter passwords associated with the connection and binding.

Router 130 may be configured to establish a Wi-Fi network and facilitate information exchange between smart device 110 and terminal 120. Router 130 may be connected to smart device 110 and/or terminal 120 in a wireless or wired manner.

Cloud server 140 may be a general purpose computer, a mainframe computer, or any combination of these components. Cloud server 140 may be implemented as a server, a server cluster consisting of a plurality of servers, or a cloud computing service center. Cloud server 140 may be operated by a third party service provider, or a manufacturer or a seller of smart device 110. Router 130 and cloud server 140 may be connected to each other through a wired or wireless network. Smart device 110 and terminal 120 may communicate with cloud server 140 via router 130. Terminal 120 may also communicate with cloud server 140 via other networks, without using router 130.

Figure 2:
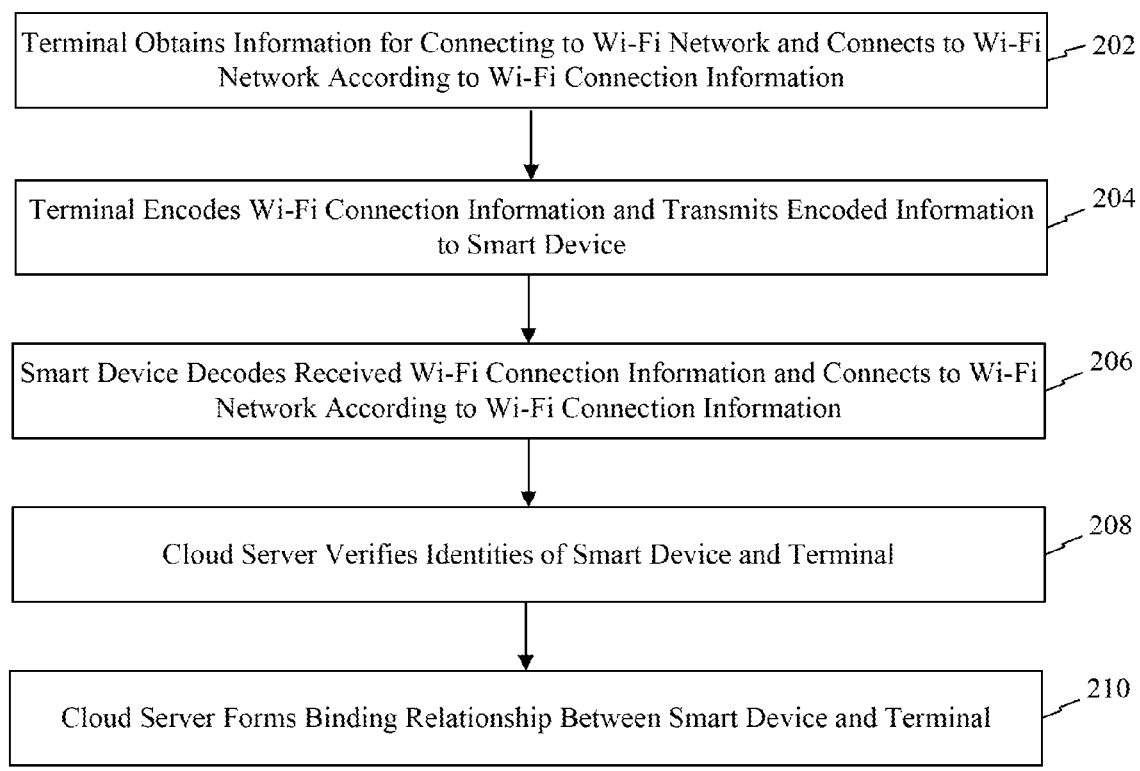
FIG. 2 is a flowchart of a method for establishing communication between a terminal and a smart device, according to an exemplary embodiment.

FIG. 2 is a flowchart of a method 200 for establishing communication between a terminal and a smart device, according to an exemplary embodiment. For example, method 200 may be used in system 100. Referring to FIG. 2, method 200 may include the following steps 202-210.

In step 202, terminal 120 obtains information for connecting to a Wi-Fi network and connects to the Wi-Fi network according to the information. The Wi-Fi connection information may include a service set identifier (SSID) and a password. Terminal 120 may have a user interface that allows a user to enter various commands and data for connecting to the Wi-Fi network. For example, a mobile phone may have a keyboard or a touch screen by which a user can enter a password of the Wi-Fi network.

In step 204, terminal 120 encodes the Wi-Fi connection information and transmits the encoded information to smart device 110. For example, terminal 120 may encode the Wi-Fi connection information into sound signals, light signals, radio signals, etc., and transmit these signals to smart device 110.

In step 206, smart device 110 decodes the received Wi-Fi connection information and connects to the Wi-Fi network according to the Wi-Fi connection information. Depending on the manner in which the Wi-Fi connection information is encoded and transmitted, smart terminal 110 may execute a corresponding decoding method to extract the SSID and password of the Wi-Fi network from the received information. Smart device 110 may then connect to the Wi-Fi network according to the SSID and password.

In step 208, cloud server 140 verifies the identities of smart device 110 and terminal 120. Smart device 110 and/or terminal 120 may send one or more unique identifiers (UIDs) and passwords to cloud sever 140. These UIDs and passwords are associated with smart device 110 and/or terminal 120. Cloud server 140 may query a database to determine whether the received UIDs and passwords match predetermined information. If the matching is successful, cloud server 140 verifies the identities of smart device 110 and terminal 120 for binding purpose. Otherwise, cloud server 140 refuses to bind smart device 110 to terminal 120.

In step 210, cloud server 140 forms a binding relationship between the smart device 110 and terminal 120. Cloud server 140 may form the binding relationship between an identification of smart device 110 and an identification of terminal 120. The identification of smart device 110 may be, for example, a media control access (MAC) address of a Bluetooth module in smart device 110. The identification of the terminal 120 may be, for example, a MAC address of a Bluetooth module or an International Mobile Equipment Identity (IMEI) code of terminal 120. Once the binding relationship is formed, cloud server 140 may facilitate information exchange between smart device 110 and terminal 120.

In exemplary embodiments, each of smart device 110, terminal 120, router 130, and cloud server 140 may run one or more applications to execute one or more steps of method 200. Method 200 may be used for a smart device 110 that has no user interface or only has limited capabilities for user-machine interactions. For example, a smart camera may only be equipped with signal lights and/or a speaker configured to indicate the operating status of the smart camera, but may have no keyboard, touch pad, or touch screen for a user to enter a command. However, terminal 120 may acquire the Wi-Fi connection information and user commands through a user interface of terminal 120. By enabling terminal 120 to send the acquired information to smart device 110, method 200 provides a convenient solution to establish communication between smart device 110 and terminal 120. Thus, the user experience may be improved.

Figure 3:
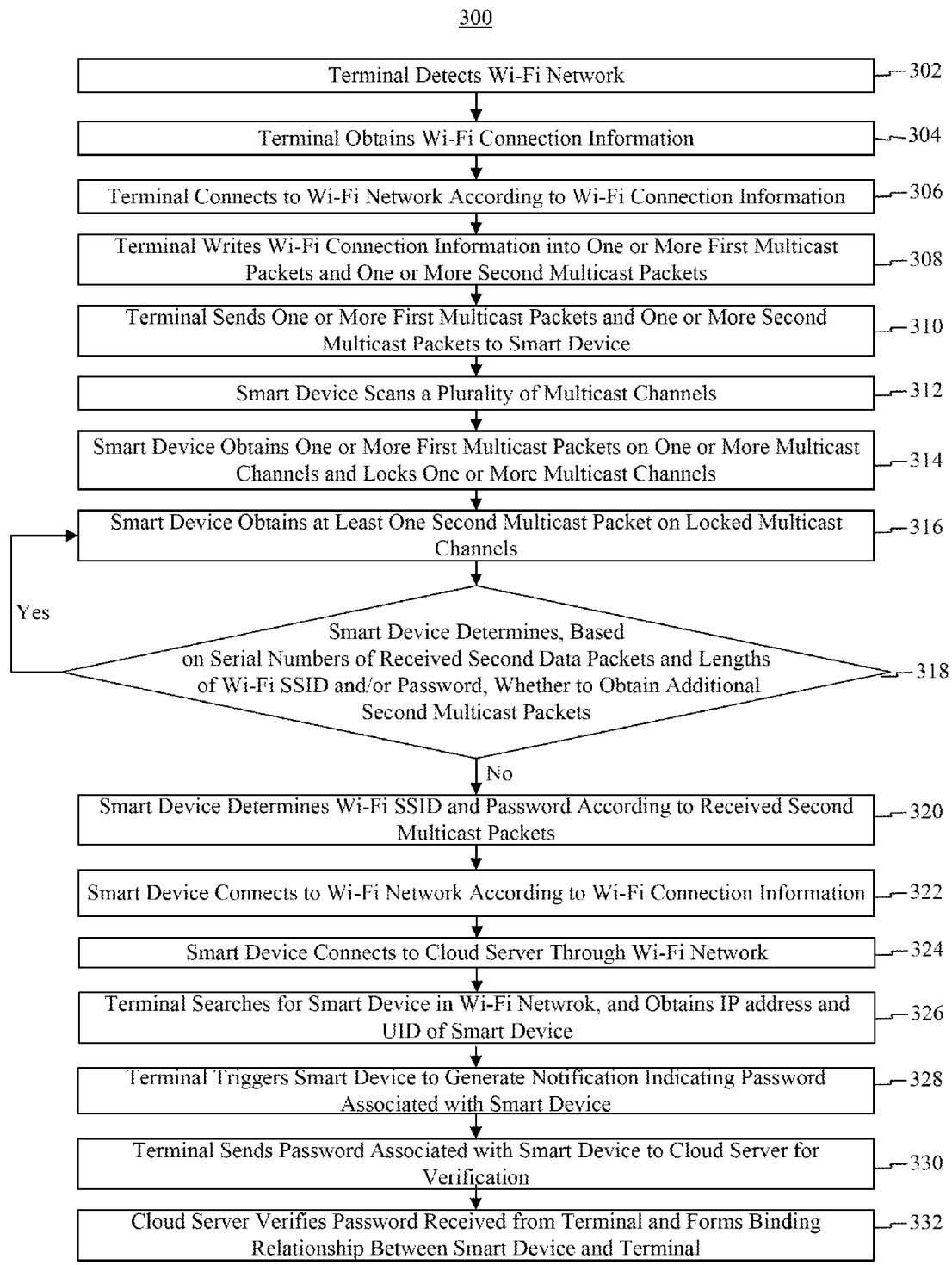
FIG. 3 is a flowchart of a method for establishing communication between a terminal and a smart device, according to an exemplary embodiment.

FIG. 3 is a flowchart of a method 300 for establishing communication between a terminal and a smart device, according to an exemplary embodiment. For example, method 300 may be used in system 100. In particular, smart device 110 and terminal 120 may have IP multicast functions. Referring to FIG. 3, method 300 may include the following steps 302-332.

In step 302, terminal 120 detects a Wi-Fi network. The Wi-Fi network may be established by router 130. In exemplary embodiments, terminal 120 may search for available Wi-Fi networks in the vicinity of terminal 120 and generate a Wi-Fi network list including one or more Wi-Fi networks provided by one or more routers. If multiple Wi-Fi networks are detected, terminal 120 may allow a user to select a network/router for connection. Terminal 120 may be configured to periodically scan the vicinity for the available Wi-Fi networks. Alternatively, terminal 120 may be installed with an application for establishing communication with smart device 110. After a user starts the application, terminal 120 may be instructed by the application to scan the vicinity for any available Wi-Fi networks.

In step 304, terminal 120 obtains information for connecting to the Wi-Fi network. The Wi-Fi connection information may include a SSID and a password. The SSID may be broadcast by router 130. Thus, terminal 120 may automatically detect the SSID. However, if the broadcast function of router 130 is disabled, terminal 120 may prompt the user to manually enter the SSID through the user interface of terminal 120. Moreover, the network password may be entered by the user through the user interface of terminal 120. Alternatively, the network password may be pre-stored in terminal 120.

In step 306, terminal 120 connects to the Wi-Fi network according to the Wi-Fi connection information. Terminal 120 may send a certification request carrying the SSID and password to router 130. If router 130 successfully verifies the SSID and password. Router 130 may record terminal 120 and return an authorization response to terminal 110. After receiving the authorization response, terminal 120 may send a request to router 130 to establish a connection, and router 130 may enable terminal 120 to access the Wi-Fi network based on the request.

In step 308, terminal 120 writes the Wi-Fi connection information into one or more first multicast packets and one or more second multicast packets. The one or more first multicast packets are multicast datagrams including at least information about the identification of terminal 120 and lengths of the Wi-Fi SSID and password. The one or more second multicast packets are multicast datagrams including at least the Wi-Fi SSID and password. Terminal 120 may encrypt the information carried by the first and second multicast packets using any method known in the art. Details of generating the first and second multicast packets are described below.

Each multicast packet may use a multicast IP address to identify the packet as a multicast packet. A mapping relationship exists between multicast IP addresses and multicast MAC addresses. The rule of mapping follows Internet Protocol Version 4 (IPv4) or IPv6. The following description assumes the multicast addresses are IPv4 addresses. However, it will be readily apparent to those skilled in the art that the principles of the present disclosure may be applied to IPv6 address. Under IPv4, a multicast IP address may contain 4 bytes (32 bits), and a multicast MAC address may contain 6 bytes (48 bits). The higher 25 bits of a multicast MAC address are fixed by the Institute of Electrical and Electronic Engineers (IEEE), while the lower 23 bits (i.e., lower 3 bytes) of the multicast MAC address are editable. The lower 23 bits of a multicast IP address can be mapped into the lower 23 bits (i.e., lower 3 bytes) of a corresponding multicast MAC address. By changing the multicast IP address, terminal 120 may write the Wi-Fi connection information in the 3 lower bytes of the multicast MAC address, which is contained in the header of a multicast packet. After sniffing the multicast packet, smart device 110 may read the multicast MAC address and determine the Wi-Fi connection information.

In exemplary embodiments, terminal 120 may use each of the lower 3 bytes in a multicast MAC address to carry different types of information. For example, terminal 120 may use a first byte for a serial number of the multicast packet, a second byte for an identification of terminal 120, and a third byte for a part of the Wi-Fi connection information.

Terminal 120 may write an identification of terminal 120 in the first multicast packets. The identification of terminal 120 may be a preset UID associated with terminal 120. The identification may be used by smart device 110 to determine whether a multicast packet is originated from terminal 120. For example, the identification may be a MAC address of terminal 120. Also for example, the identification may be a code preset by a manufacturer of smart device 110. Yet for another example, the identification may be a random synchronous code generated by terminal 120, configured to initiate synchronization between smart device 110 and terminal 120. Similarly, each second multicast packet may also include the identification of terminal 120.

Terminal 120 may also write lengths of the Wi-Fi SSID and password in the first multicast packets. "Length" refers to the number of bytes. For example, if the password is 1234, then the length of the password is 4.

In some embodiments, terminal 120 may use reserved serial numbers for the first multicast packets, to distinguish them from the second multicast packets and to indicate the type of information carried by each first multicast packet. For example, a first multicast packet with serial number 0 may indicate that the packet carries information about the length of the Wi-Fi password.

Terminal 120 may write at least one byte of the Wi-Fi SSID or password in each second multicast packet. For example, if the Wi-Fi password is 30 bytes long, terminal 120 may generate 30 second multicast packets for carrying the password. Terminal 120 may also insert a serial number into each second multicast packet. Each serial number corresponds to one byte of Wi-Fi SSID or password. In the above example, the nth second multicast packet carries the nth byte of the Wi-Fi password.

In step 310, terminal 120 sends the one or more first multicast packets and the one or more second multicast packets to smart device 120.

In step 312, smart device 110 scans a plurality of multicast channels. To improve the scanning efficiency, smart device 100 may divide all the available multicast channels into at least two groups. The first group of channels is historically used more frequently than the second group of channels. Smart device 110 may first scan the first group of channels. If no multicast packets are detected on the first group of channels, smart device 110 may continue to scan the second group of channels. Smart device 110 may scan each group of channels multiple times to ensure scanning accuracy. For example, the multicast channels 1, 6, and 11 may be more frequently used than other channels. Thus, smart device 110 may first scan these three channels for one or more times. If no multicast packets are detected on the three channels, smart device 110 may continue to scan the rest of multicast channels.

In step 314, smart device 110 obtains the one or more first multicast packets on one or more multicast channels and locks the one or more multicast channels. Smart device 110 may decode and decrypt the information carried by a multicast packet using methods consistent with the methods employed by terminal 120 to generate the multicast packet. If the identification of terminal contained in the first multicast packets matches the identification of terminal 120, smart device 110 locks the channels on which the first multicast packets are received. For example, after receiving on channel 6 a first multicast packet containing identification matching the identification of terminal 120, smart device 110 may lock channel 6.

In step 316, smart device 110 obtains at least one second multicast packet on the locked multicast channels. Smart device 120 may choose to receive only the multicast packets labeled with the identification of terminal 120. Smart device

110 may extract the serial number, identification of terminal, and the Wi-Fi SSID or password information carried by the second multicast packets.

In step 318, smart device 110 determines, based on the serial numbers of the received second multicast packets and the lengths of the Wi-Fi SSID and/or password, whether to obtain additional second multicast packets. For example, if a second multicast packet carries one byte of Wi-Fi SSID or password and the combined length of the SSID and password is 50 bytes long, smart device 110 needs to obtain at least 50 second multicast packets to determine the SSID and password. When smart device 110 has only received the first 45 second multicast packets, smart device 110 may determine that 5 more second multicast packets are needed. In contrast, after receiving 50 second multicast packets, smart device 110 may determine that no more second multicast packets are needed. If additional second multicast packets are needed to determine the Wi-Fi SSID and/or password, smart device 110 returns to step 316. Otherwise, smart device 110 proceeds to step 320.

In step 320, smart device 110 determines the Wi-Fi SSID and password according to the received second multicast packets. Smart device 110 may arrange the byte(s) of Wi-Fi connection information carried by each second multicast packet in an order consistent with the corresponding serial number to assemble the correct Wi-Fi SSID and password.

In step 322, smart device 110 connects to the Wi-Fi network according to the Wi-Fi SSID and password. This step is similar to step 306.

In step 324, smart device 110 connects to cloud server 140 through the Wi-Fi network. In one embodiment, smart device 110 may report a password associated with smart device 110 to cloud server. Such password may be preset by the manufacturer of smart device 110. In another embodiment, cloud server 140 may assign a password to smart device 110.

In step 326, terminal 120 searches for smart device 110 in the Wi-Fi network, and acquires an IP address and a UID of smart device 110. In one embodiment, the UID may be a MAC address of smart device 110. Terminal 120 may use the UID to query cloud server 140 as to whether a binding relationship has been formed between smart device 110 and terminal 120. If no binding relationship has been formed, terminal 120 may prompt the user to bind smart device 110 to terminal 120.

In step 328, terminal 120 triggers smart device 110 to generate a notification indicating the password associated with smart device 110. For example, if the user instructs terminal 120 to form a binding relationship between smart device 110 and terminal 120, terminal 120 may use the IP address of smart device 110 to run a common gateway (CGI) script on smart device 110 to trigger the broadcasting of the password by smart device 110 in a voice form.

In step 330, terminal 120 sends the password associated with smart device 110 to cloud server 140 for verification. After hearing the password, the user may enter the password in terminal 120, which then passes the password to cloud server 140 for verification.

In step 332, cloud server 140 verifies the password received from terminal 120 and forms a binding relationship between smart device 110 and terminal 120. This step is similar to steps 208 and 210 shown in FIG. 2. After the binding relationship is formed, cloud server 140 may instruct smart device 110 to stop the notification of the password, e.g., stop broadcasting the password.

By using IP multicast, method 300 enables smart device 110 to obtain the Wi-Fi connection information and to further connect to the Wi-Fi network. Method 300 does not require a user to directly operate on smart device 110, and thus is particularly suitable for smart devices that have no user interface or only have limited capabilities for user-machine interaction. Moreover, method 300 does not require a wired connection for smart device 110 and is largely automated, and thus provides a fast and convenient solution to establish communication between smart device 110 and terminal 120.

Figure 4:
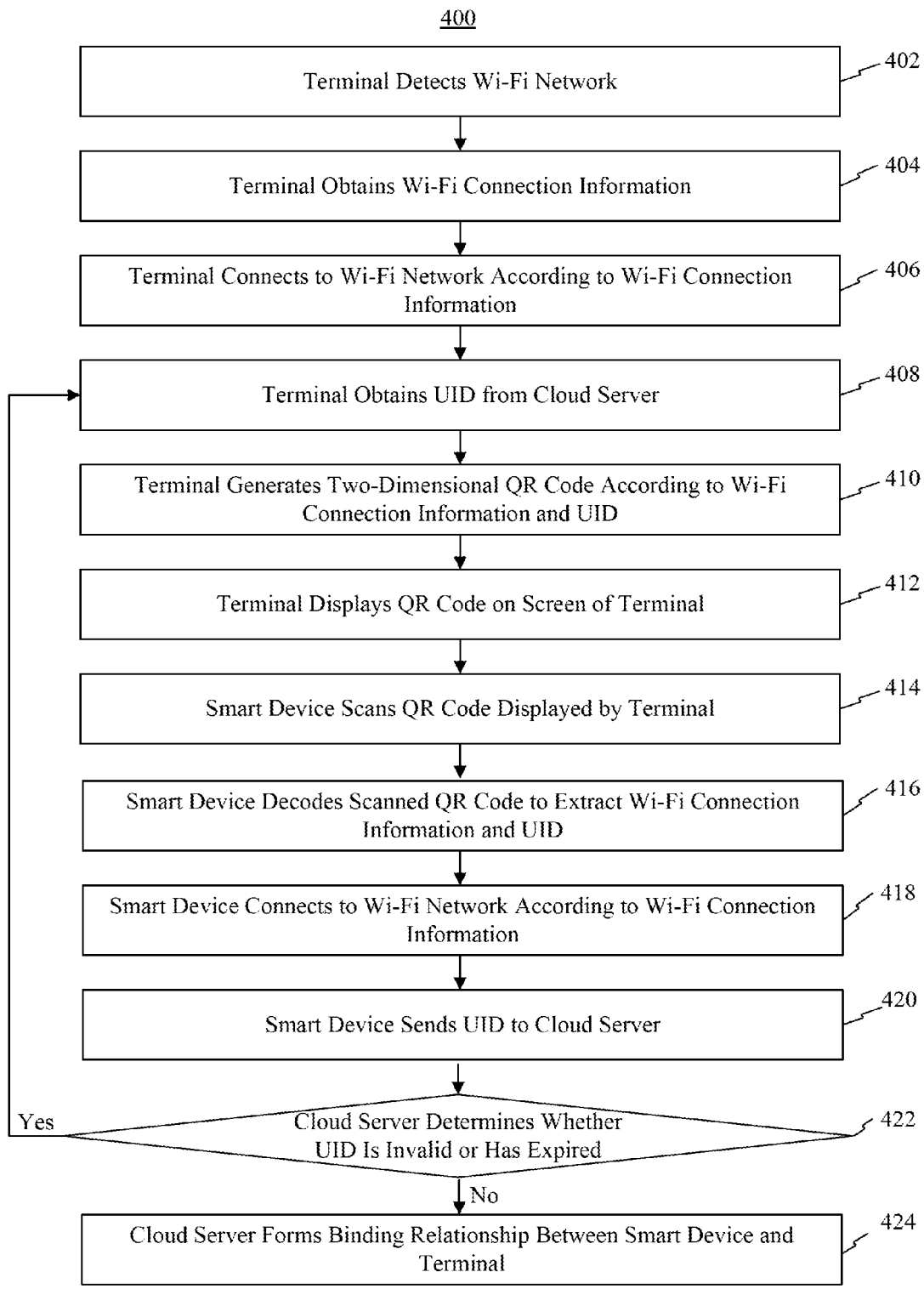
FIG. 4 is a flowchart of a method for establishing communication between a terminal and a smart device, according to an exemplary embodiment.

FIG. 4 is a flowchart of a method 400 for establishing communication between a terminal and a smart device, according to an exemplary embodiment. For example, method 400 may be used in system 100. In particular, smart device 110 may have capabilities to acquire and analyze image information. For example, smart device 110 may be a smart camera or a device equipped with a camera. Referring to FIG. 4, method 400 may include the following steps 402-424.

In step 402, terminal 120 detects a Wi-Fi network.

In step 404, terminal 120 obtains information for connecting to the Wi-Fi network.

In step 406, terminal 120 connects to the Wi-Fi network according to the Wi-Fi connection information.

In exemplary embodiments, steps 402-406 are similar to steps 302-306 shown in FIG. 3.

In step 408, terminal 120 obtains a unique identifier (UID) from cloud server 140. The UID may be used for identifying a binding relationship to be formed between a smart device 110 and a terminal 130. In exemplary embodiments, terminal 120 may be installed with an application for establishing communication between smart device 110 and terminal 120. After connecting to the Wi-Fi network, the application may instruct terminal 120 to send a request to cloud server 140 for generating the UID. Cloud server 140 may set a time limit for the UID, so that the UID will expire after a predetermined time. For example, the UID may include a time stamp indicating when the UID is generated and for how long it is valid.

In step 410, terminal 120 generates a graphic code, such as a two-dimensional quick response (QR) code, according to the Wi-Fi connection information and the UID. The SSIDs and passwords associated with different routers may be set by the router manufacturers according to different formats, such as UTF-8, GB 2312, ASCII, etc. Some formats may introduce special characters into the QR code, later causing failures during decoding of the QR code. Thus, before generating the QR code, terminal 120 may convert the SSID and password into a uniform format. Terminal 120 may then use the converted SSID and password to generate the QR code according to any method known in the art. Moreover, an encryption method may be used in generating the QR code to prevent an unauthorized device from deciphering the QR code.

In step 412, terminal 120 displays the QR code on a screen of terminal 120. The size of the displayed QR code may be adjustable. For example, if terminal 120 has a touch screen, the user may enlarge or shrink the QR code by pinch two fingers together or move the fingers apart on the screen.

Figure 5:
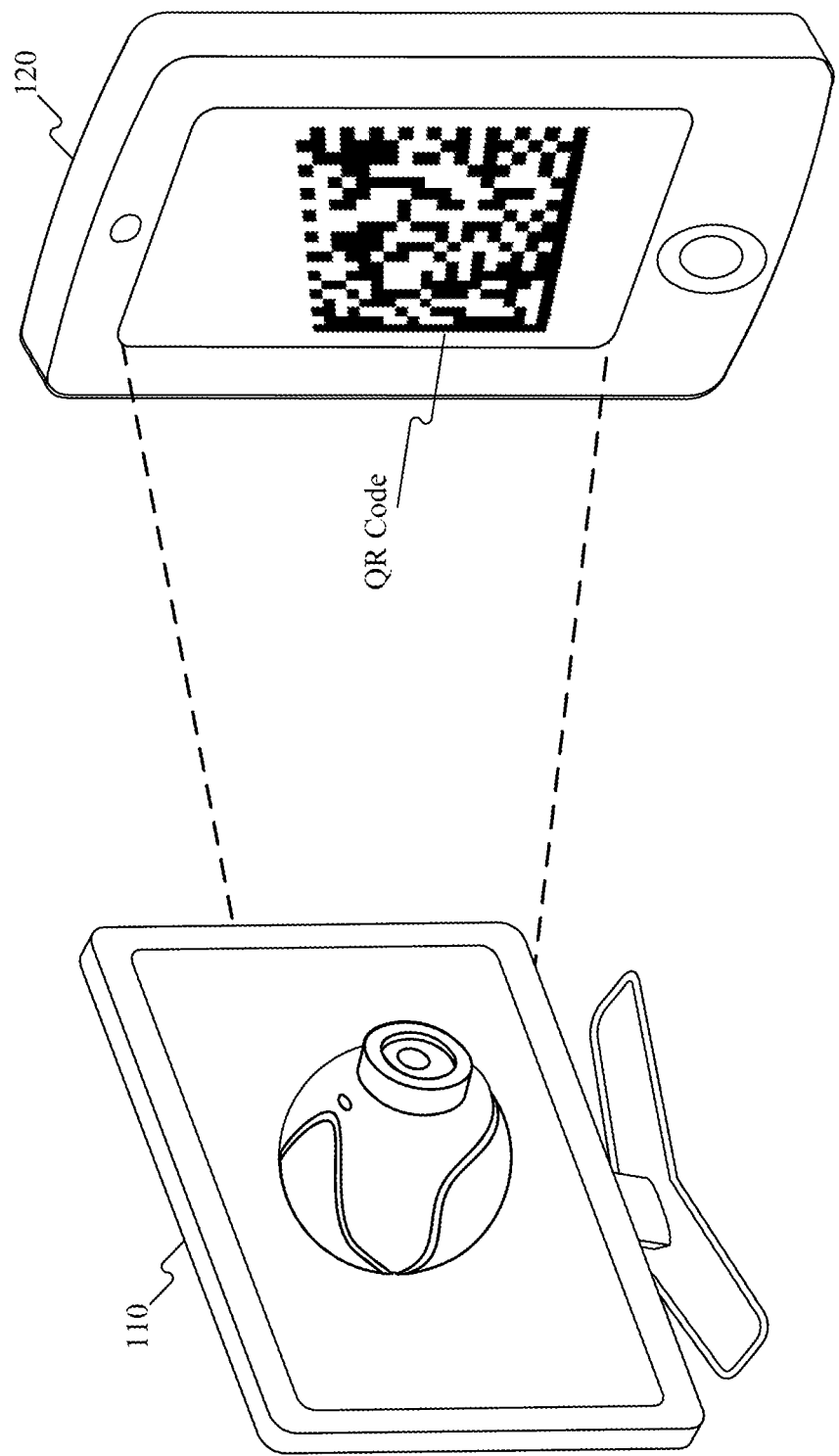
FIG. 5 is a schematic diagram illustrating an implementation of the method shown in FIG. 4, according to an exemplary embodiment.

In step 414, smart device 110 scans the QR code displayed by terminal 120. FIG. 5 is a schematic diagram illustrating an implementation of method 400, according to an exemplary embodiment. Referring to FIG. 5, the user may hold terminal 120 in front of smart device 110 and facing the QR code to the imaging direction of smart device 110. Several methods may be used to increase the success rate of the scanning. The user may separate smart device 110 and terminal 120 in a distance approximately equal to the height of terminal 120. For example, a tablet computer may be kept from smart device 110 in a longer distance than a mobile phone, because the tablet computer is usually bigger than the mobile phone. Furthermore, as described above, the user may adjust the size of the displayed QR code to enable smart device 110 to take a clear image of the full QR code. Smart device 110 may have signal lights or a speaker configured to inform the user whether the scanning is successful. For example, smart device 110 may use a certain color of signal lights or a prompting sound to inform the user that the scanning is unsuccessful. Based on this feedback, the user may further adjust the distance, the height, and the size of the displayed QR code until the scanning succeeds.

In step 416, smart device 110 decodes the scanned QR code to extract the Wi-Fi connection information and UID. As described in step 404, the QR code may be generated from SSIDs and passwords that are pre-converted into a uniform format. Thus, smart device 110 may use the same decoding method for SSIDs and passwords that are originally in different formats. This way, the compatibility of smart device 110 may be improved.

In step 418, smart device 110 connects to the Wi-Fi network according to the Wi-Fi connection information. This step is similar to step 306 shown in FIG. 3.

In step 420, smart device 110 sends the UID to cloud server 140.

In step 422, cloud server 140 determines whether the UID is invalid or has expired. After receiving the UID from smart device 110, cloud server 140 may analyze the time stamp associated the UID to determine whether the UID is timely.

In step 424, if the UID is valid and timely, cloud server 140 forms a binding relationship between smart device 110 and terminal 120. If the UID is invalid or has expired, cloud server 140 may inform terminal 120 that the binding has failed. Smart device 110 may then generate an error message, e.g., flashing a signal lights or making a beeping sound, indicating the binding has failed. Steps 408-424 need to be executed again to establish the communication between smart device 110 and terminal 120

Method 400 can quickly establish communication between smart device 110 and terminal 120 because it is easy to use and the success rate of scanning a QR code is high. Moreover, because the QR code is not transmitted over the Wi-Fi network, method 400 may be used under an unstable Wi-Fi condition and to reduce the probability of unauthorized interception.

By using methods 200-400, one terminal may be bound with a plurality of smart devices, and one smart device may also be bound with a plurality of terminals. After smart device 110 is bound to terminal 120, terminal 120 may connect to smart device 110 and exchange data with smart device 110.

Figure 6:
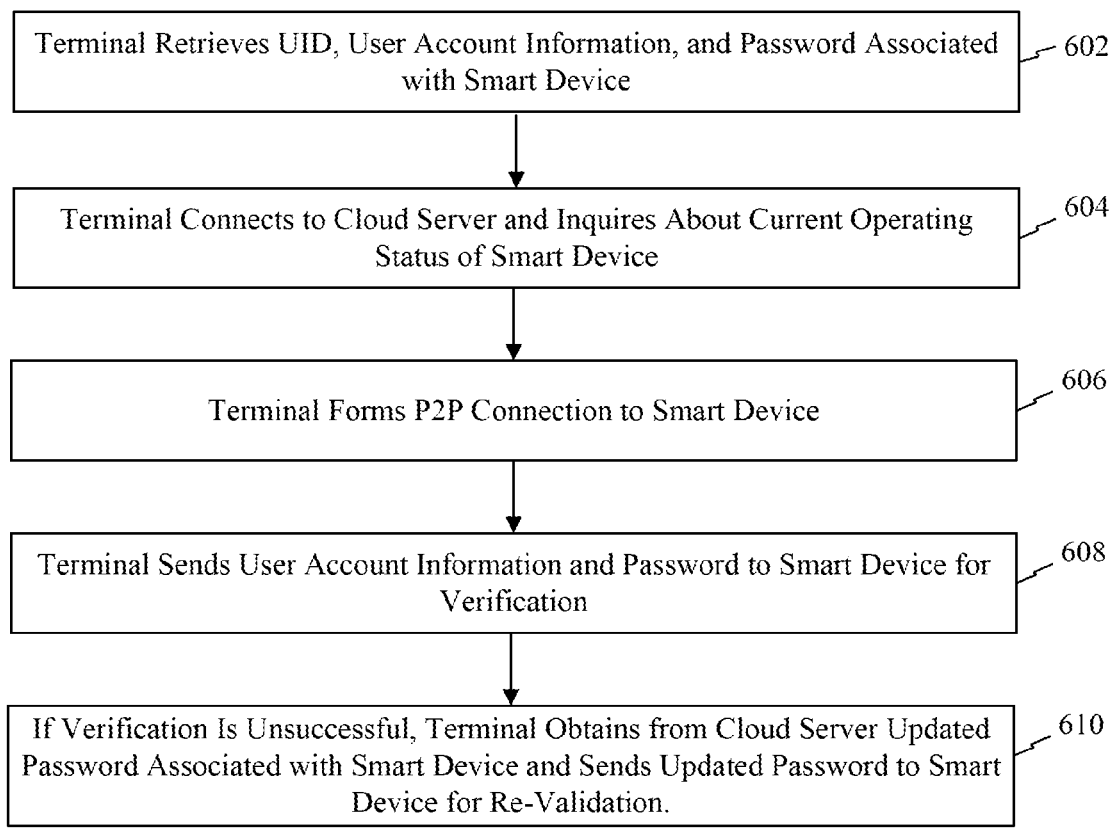
FIG. 6 is a flowchart of a method for establishing communication between a terminal and a smart device that has been bound to the terminal, according to an exemplary embodiment.

FIG. 6 is a flowchart of a method 600 for establishing communication between a terminal and a smart device that has been bound to the terminal, according to an exemplary embodiment. For example, method 600 may be used in system 100. In particular, a binding relationship has already been formed between smart device 110 and terminal 120. Method 600 may be used at any time when terminal 120 decides to exchange information with smart device 110. Referring to FIG. 6, method 600 may include the following steps 602-610.

In step 602, terminal 120 retrieves a UID, a user name, and a password associated with smart device 110. In exemplary embodiments, terminal 120 may save in its memory a list of devices that have been bound with terminal 120. The device list may include the UID, the user name, and the password associated with each device.

In step 604, terminal 120 connects to cloud server 140 and inquires about a current operating status of smart device 110. Cloud server 140 may be configured as a peer-to-peer (P2P) server to facilitate the forming of a P2P connection between smart device 110 and terminal 120 using any method known in the art. Cloud server 140 may also be configured to store and manage the user names and passwords associated with smart device 110. After connecting to cloud server 140, terminal 120 may send the UID associated with smart device 110 to cloud 140 for status verification. Cloud server 140 may detect whether smart device 110 is connected to a network. Cloud server may also determine whether smart device 110 is operating normally and available for make a connection with terminal 120. If smart device 110 is available, terminal 120 may proceed to step 606. Otherwise, terminal 120 may end method 600.

In step 606, terminal 120 forms a P2P connection to smart device 110.

In step 608, terminal 120 sends the user name and password to smart device for verification. If the verification is successful, terminal 120 may start to exchange information with smart device 110 and method 600 ends. In many situations, however, cloud server 140 may periodically change the password associated with smart device 110 to ensure data security. If the password used by smart device 110 has expired, the verification will be unsuccessful and terminal 110 proceeds to step 610.

In step 610, if the verification is unsuccessful, terminal 120 obtains from cloud server 140 an updated password associated with smart device 110 and sends the updated password to smart device 110 for re-validation. While still maintaining the P2P connection to smart device 110, terminal 120 may request cloud server 140 to send the updated password. If the smart device 110 verifies the updated password, terminal 120 may start to exchange information with smart device 110. Moreover, terminal 120 may save the updated password in its memory for future use.

In exemplary embodiments, terminal 120 may initiate method 600 when a user turns on terminal 120, when terminal 120 connects to a network, or when terminal 120 starts an application for managing one or more devices that are bound to terminal 120. Terminal 120 may perform method 600 for each bound device so that terminal 120 can be ready for communicating with these devices. This way, a user may later use terminal 120 to exchange information with smart device 110 without experiencing significant system delay. For example, if smart device 110 is a smart camera bound to terminal 120, terminal 120 may perform method 600 once the terminal is turned on. When a user later runs a smart camera application, terminal 120 may immediately obtain and display real-time video information captured by the smart camera, without spending time establishing communication with the smart camera.

Figure 7:
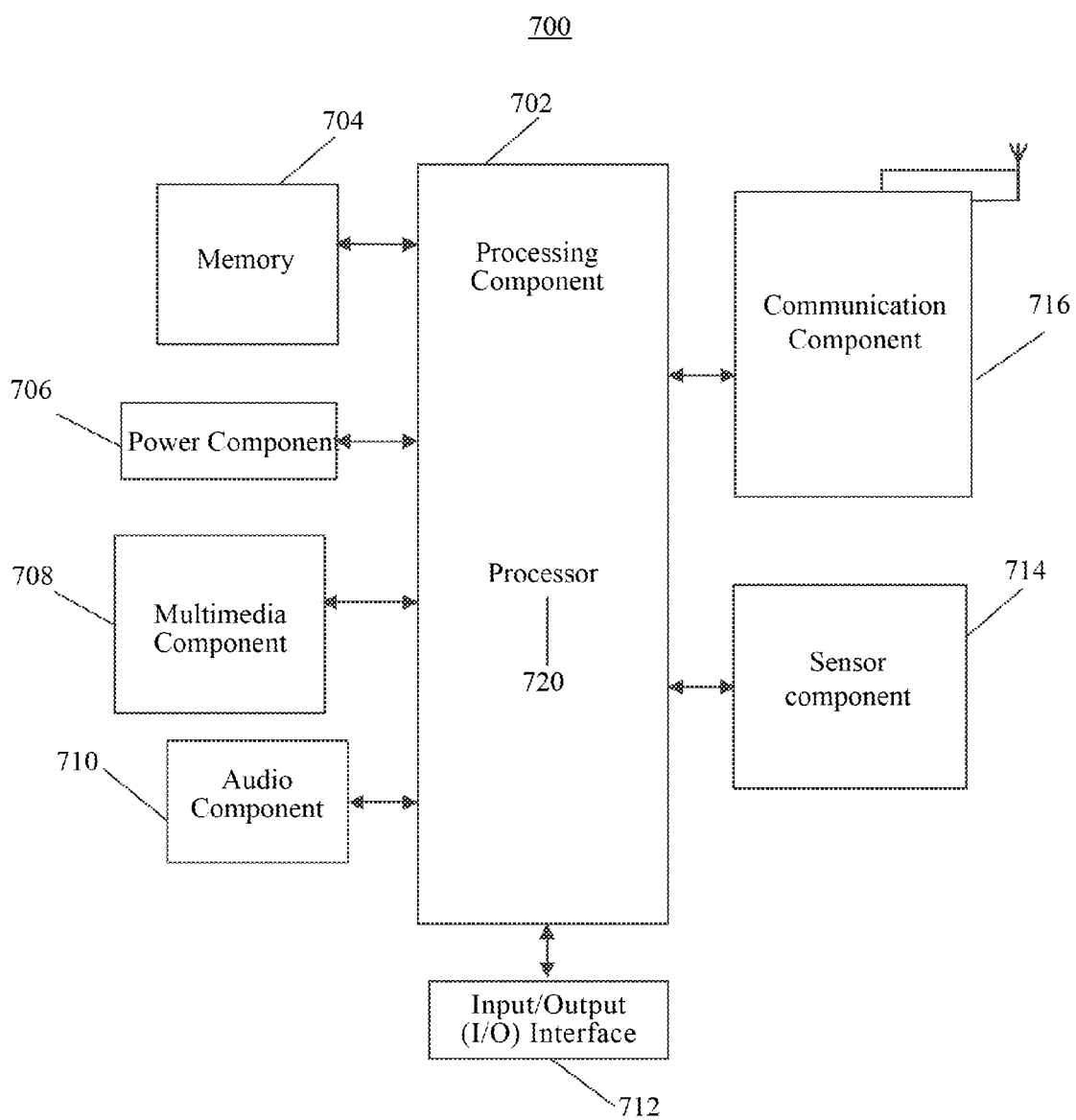
FIG. 7 is a block diagram of a device for establishing communication between a terminal and a smart device, according to an exemplary embodiment.

FIG. 7 is a block diagram of a device 700 for establishing communication between a terminal and a smart device, according to an exemplary embodiment. For example, device 700 may be implemented as smart device 110 or terminal 120. Referring to FIG. 7, device 700 may include one or more of the following components: a processing component 702, a memory 704, a power component 706, a multimedia component 708, an audio component 710, an input/output (I/O) interface 712, a sensor component 714, and a communication component 716.

Processing component 702 may be configured to control overall operations of device 700, such as the operations associated with display, telephone calls, data communications, camera operations, and recording operations. Processing component 702 may include one or more processors 720 to execute instructions to perform all or part of the steps in the above described methods. Moreover, processing component 702 may include one or more modules which facilitate the interaction between processing component 702 and other components. For instance, processing component 702 may include a multimedia module to facilitate the interaction between multimedia component 708 and processing component 702.

Memory 704 may be configured to store various types of data to support the operation of device 700. Examples of such data include instructions for any applications or methods operated on device 700, contact data, phonebook data, messages, pictures, video, etc. Memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk.

Power component 706 may provide power to various components of device 700. Power component 706 may include a power management system, one or more power sources, and any other components associated with the generation, management, and distribution of operating power in device 700.

Multimedia component 708 may include a screen providing an output interface between device 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, multimedia component 708 may include a front camera and/or a rear camera. The front camera and/or the rear camera may receive external multimedia data while device 700 is in an operation mode, such as a photographing mode or a video mode. Each of the front camera and the rear camera may be a fixed optical lens system or have focus and optical zoom capability.

Audio component 710 may be configured to output and/or input audio signals. For example, audio component 710 may include a microphone configured to receive an external audio signal when device 700 is in an operation mode, such as a call mode, a recording mode, and a voice recognition mode. The received audio signal may be further stored in memory 704 or transmitted via communication component 716. In some embodiments, audio component 710 may further include a speaker to output audio signals.

I/O interface 712 may provide an interface between processing component 702 and peripheral interface modules, such as a keyboard, a click wheel, buttons, and the like. The buttons may include, but are not limited to, a home button, a volume button, a starting button, and a locking button.

Sensor component 714 may include one or more sensors to provide status assessments of various aspects of device 700. For instance, sensor component 714 may detect an on/off status of device 700, relative positioning of components, e.g., the display and the keypad, of device 700, a change in position of device 700 or a component of device 700, a presence or absence of user contact with device 700, an orientation or an acceleration/deceleration of device 700, and a change in temperature of device 700. Sensor component 714 may include a proximity sensor configured to detect the presence of nearby objects without any physical contact. Sensor component 714 may also include a light sensor, such as a CMOS or CCD image sensor, for use in imaging applications. In some embodiments, sensor component 714 may also include an accelerometer, a gyroscope, a magnetic sensor, a pressure sensor, or a temperature sensor.

Communication component 716 may be configured to facilitate communication, wired or wirelessly, between the device 700 and other devices. Device 700 may access a wireless network based on one or more communication standard, such as Wi-Fi, LTE, 2G, 3G, 4G, 5G, etc. In one exemplary embodiment, communication component 716 may receive a broadcast signal or broadcast associated information from an external broadcast management system via a broadcast channel In one exemplary embodiment, communication component 716 may further include a near field communication (NFC) module to facilitate short-range communications. In other embodiments, communication component 716 may be implemented based on a radio frequency identification (RFID) technology, an infrared data association (IrDA) technology, an ultra-wideband (UWB) technology, a Bluetooth (BT) technology, or other technologies.

In exemplary embodiments, device 700 may be implemented with one or more application-specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in memory 704, executable by processor 720 in the device 700, for performing the above-described methods. For example, the non-transitory computer-readable storage medium may be a read-only memory (ROM), a random access memory (RAM), a CD-ROM, a magnetic tape, a memory chip (or integrated circuit), a hard disc, a floppy disc, an optical data storage device, or the like.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact constructions that are described above and illustrated in the accompanying drawings, and that various modifications and changes can be made without departing from the scope thereof. It is intended that the scope of the invention should only be limited by the appended claims.

What is claimed is:

1. A method for establishing communication between a device and a terminal, comprising:
  obtaining wireless connection information of a wireless network;
  generating a plurality of multicast packets including wireless connection information of the wireless network;
  sending the multicast packets to the device; and
  after the device is connected to the wireless network, trigger, by the terminal, the device to generate a notification indicating a password associated with the device; and
  sending the password associated with the device to a cloud server for verification.

2. The method according to claim 1, wherein
  the plurality of multicast packets comprise one or more first multicast packets and one or more second multicast packets; and
  generating the plurality of multicast packets further comprises:
    writing into the one or more first multicast packets an identification of the terminal and a length of a wireless password associated with the wireless network; and
    writing into each second multicast packet a serial number and at least a part of the wireless password corresponding to the serial number.

3. The method according to claim 1, wherein generating the plurality of multicast packets further comprises:
  encrypting the information included in the plurality of multicast packets.

4. A terminal, comprising:
  a memory storing instructions; and
  a processor configured to execute the instructions to:
    obtain wireless connection information of a wireless network;
    generate a plurality of multicast packets including wireless connection information of the wireless network;
    send the multicast packets to a device; and
    after the device is connected to the wireless network, trigger the device to generate a notification indicating a password associated with the device; and
    sending the password associated with the device to a cloud server for verification.

5. The terminal according to claim 4, wherein
  the plurality of multicast packets comprise one or more first multicast packets and one or more second multicast packets; and
  the processor is further configured to execute the instructions to:
    write into the one or more first multicast packets an identification of the terminal and a length of a wireless password associated with the wireless network; and
    write into each second multicast packet a serial number and at least a part of the wireless password corresponding to the serial number.

6. The terminal according to claim 4, wherein the processor is further configured to execute the instructions to:
  encrypt the information included in the multicast packets.

7. A non-transitory computer-readable storage medium storing instructions for establishing communication between a device and a terminal, the instructions causing a processor to perform operations comprising:
  obtaining wireless connection information of a wireless network;
  generating a plurality of multicast packets including wireless connection information of the wireless network;
  sending the multicast packets to the device; and
  after the device is connected to the wireless network, trigger, by the terminal, the device to generate a notification indicating a password associated with the device; and
  sending the password associated with the device to a cloud server for verification.

8. The non-transitory computer-readable storage medium of claim 7, wherein
  the plurality of multicast packets comprise one or more first multicast packets and one or more second multicast packets; and
  the operations further comprise:
    writing into the one or more first multicast packets an identification of the terminal and a length of a wireless password associated with the wireless network; and
    writing into each second multicast packet a serial number and at least a part of the wireless password corresponding to the serial number.

9. The non-transitory computer-readable storage medium of claim 7, wherein the operations further comprise:
  encrypting the information included in the multicast packets.

* * * * *